April 15, 1930.   C. A. XARDELL   1,754,706
HANDLE FOR MANUALLY PROPELLED IMPLEMENTS
Filed Nov. 27, 1925
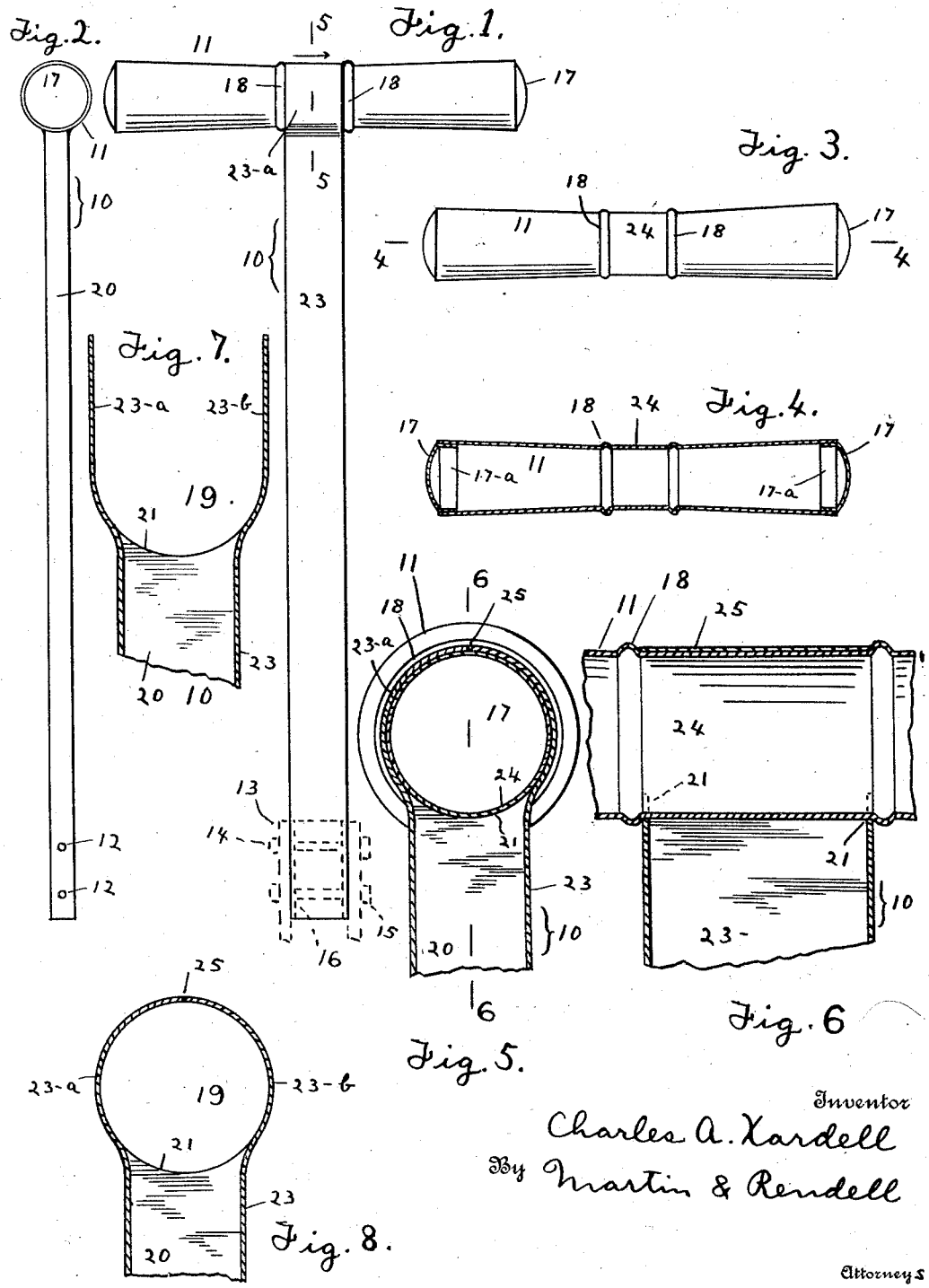

Patented Apr. 15, 1930

1,754,706

UNITED STATES PATENT OFFICE

CHARLES A. XARDELL, OF UTICA, NEW YORK, ASSIGNOR TO THE BOSSERT CORPORATION, OF UTICA, NEW YORK, A CORPORATION

HANDLE FOR MANUALLY-PROPELLED IMPLEMENTS

Application filed November 27, 1925. Serial No. 71,681.

My present invention relates to handles for manually propelled implements such as lawn mowers, lawn trimmers, express wagons, baggage trucks and small garden or farm implements any of which are intended to be pushed or drawn by hand.

The purpose of my invention is to provide an article of the class described of new and improved form and one which is strong but economical in construction and durable and rigid in use.

A further purpose is to provide a handle of the class described which is formed of sheet metal and particularly to have the main handle so shaped and formed as to receive directly thereon the cross handle without the use of third parts or other fastening or securing means; and to provide the cross handle with spaced projections or ribs that will be located at the opposite sides of the main handle and assist in preventing longitudinal movement of the cross handle in the main handle.

A further purpose is to provide a handle of the class described where the main handle will be of sheet metal formed into a rectangular tube of the same shape and proportion as the now commonly used wooden handle so that handles embodying my invention may be substituted for old wooden handles in implements now in use; a further purpose is to provide a handle of sheet metal with an eye formed in the upper end of the main handle by cutting away opposite side portions of the main handle and bringing the remaining portions of the wall of the main handle towards each other around the central portion of the cross handle and there secured together to permanently hold the cross handle and main handle together.

Further purposes and advantages of my invention will appear from the specification and claim herein.

Fig. 1 is a plan or top side view of a handle embodying my invention and Fig. 2 is a side view of said handle.

Fig. 3 is a plan view of the cross handle.

Fig. 4 is a longitudinal sectional view on line 4—4 of Fig. 3.

Fig. 5 is a sectional view on an enlarged scale on line 5—5 of Fig. 1.

Fig. 6 is a sectional view on line 6—6 of Fig. 5.

Fig. 7 is a longitudinal sectional view of the upper end of the main handle upon the same scale as Figs. 5 and 6, as it appears when ready to receive the cross handle and before the upper ends have been bent down about the cross handle, and Fig. 8 is a similar view of said part alone after its projecting portions have been brought together to complete the eye.

Handles of the class herein described are composed of a main handle 10 and a cross handle 11 with the lower end of the main handle adapted to be secured in the ordinary way to the lawn mower or other hand propelled implement by means of bolts extending through bolt holes 12 near the lower end of the main handle 10.

In handles according to my invention preferably both the main handle and the cross handle are made of sheet metal usually sheet steel shaped into tubing of the desired size and shape. Preferably as shown in the drawings the main handle 10 will be rectangular in shape substantially twice as wide as it is thick and so duplicating the usual shape and proportion of the now common wooden handles for similar articles. This rectangular shape enables the lower end of the handle to be securely mounted between the usual ears 13 of the hand propelled vehicle by means of bolts 14 and nuts 15. The rectangular shape of this main handle at its upper end also gives a wide bearing for the cross handle 11 to be secured in the upper end of said main handle. In the lower end of the main handle there may be placed a re-inforcement 16 extending from the lower extremity of the handle upwardly a little distance past the upper bolt hole 12. This re-inforcement may consist of a section of strong tubing closely fitting the inside of the main handle or it may be a short length of wood entirely filling the lower end of said main handle.

In the full and preferred form of my invention the cross handle 11 is also made of sheet metal formed into a tube and such tube is preferably circular in cross section in order to be conveniently grasped by the hand. As shown in the drawings the opposite projecting halves of this cross handle will increase slightly in size as they leave the main handle. The ends of these tubular cross handles may if desired be filled by inserting therein caps 17 which may be formed of sheet metal having flanges 17$^a$ fitting closely within the outer ends of said cross handles.

Immediately outside of the main handle 10 the cross handles are provided with a pair of integral ribs 18 which aid in locating the cross handle in the main handle during assembling of the parts and which when the parts are once assembled permanently hold the cross handle from longitudinal movement in the main handle.

In handles embodying my invention the cross handle is mounted directly in the upper end of the main handle without the use of third members and preferably without the use of any separate fastening means or devices. I accomplish this purpose by forming an eye 19 directly in the upper end of the main handle. In doing this the upper end of the main handle has the metal of its narrow sides 20 removed leaving a rounding, that is concave, edge 21 at the upper end of each of the side walls 20 of the tubing. The wide top and bottom walls 23 project at their upper ends past the edge 21 as at 23$^a$ and 23$^b$ and these projecting portions of the top and bottom walls are either initially formed or subsequently shaped to first curve away from each other and then curve towards and meet each other to form with the edge 21 a complete circle resulting in the eye 19. It will be understood that before the eye is finally completed by bringing the extremities of the projecting portions 23$^a$ and 23$^b$ together the central portion 24 of the cross handle 11 will be placed in said eye. It will then be seen that by wrapping the portions 23$^a$ and 23$^b$ about the central portion 24 of the cross piece and welding the meeting extremities of the portions 23$^a$ and 23$^b$ together on line 25 the cross handle will be rigidly and permanently mounted in the main handle 10. In addition to the welding or other fastening at line 25 at the extremities of portions 23$^a$ and 23$^b$ other fastening members will not be required although the meeting faces of the main handle and the enclosed portion 24 of the cross handle may be brazed or welded together if desired.

It will be seen that the joint thus made between the cross handle and the main handle is well adapted to pass on to the main handle the strain of regular pushing or propelling work and that the wide bearing formed by the wide sides 23 with its portions 23$^a$ and 23$^b$ wrapped about the cross handle give wide bearings well adapted to stand any angular or twisting strain.

What I claim as new and desire to secure by Letters Patent is:

In a two-piece, T-shaped handle the combination of a main handle consisting of one piece of sheet metal formed into a tube with opposite portions of the tube cut away at the upper end of the handle and forming edges in the line of the main handle adapted to receive the thrust from a cross handle and with the remaining portions of the main handle at that end extended and meeting and secured to each other forming an eye and a cross handle consisting of one piece of sheet metal formed into a tube and permanently and rigidly secured in said eye and seating directly against said edges whereby end thrust is transmitted directly to a longitudinally extending portion of the main handle, said cross handle being pre-formed to have its central portion closely fit within the eye of the main handle and to have portions of enlarged diameter immediately beyond the eye to prevent longitudinal movement of the cross handle relative to the eye.

In witness whereof I have affixed my signature, this 21st day of November, 1925.

CHARLES A. XARDELL.